(12) United States Patent
Long

(10) Patent No.: US 6,564,690 B1
(45) Date of Patent: May 20, 2003

(54) INTERFACE PALLET ASSEMBLY FOR A HELICOPTER-BASED WEAPON SYSTEM

(75) Inventor: David R. Long, Jasper, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/216,467

(22) Filed: Aug. 12, 2002

(51) Int. Cl.[7] ............................................... F41A 23/00
(52) U.S. Cl. ...................................... 89/37.16; 224/181
(58) Field of Search ..................... 248/176.3; 89/37.03, 89/37.04, 37.07, 37.11, 37.16, 37.17, 37.19, 37.21, 37.22; 224/118.1

(56) References Cited

U.S. PATENT DOCUMENTS

| | | | |
|---|---|---|---|
| 5,417,141 A | 5/1995 | Sanderson | 89/37.22 |
| 5,421,239 A | 6/1995 | Sanderson | 89/37.22 |
| 5,517,895 A | * 5/1996 | Sanderson | 89/37.16 |
| 5,767,436 A | 6/1998 | Sanderson et al. | 89/37.22 |
| 6,250,196 B1 | 6/2001 | Sanderson | 89/37.16 |
| 6,250,197 B1 | 6/2001 | Sanderson | 89/37.16 |
| 6,293,179 B1 | 9/2001 | Sanderson | 89/37.03 |

* cited by examiner

Primary Examiner—Ramon O. Ramirez
(74) Attorney, Agent, or Firm—Mark Homer

(57) ABSTRACT

Disclosed herein is an interface pallet assembly for use between the cabin deck of a helicopter and a large, heavy weapon system. The assembly incorporates a self-contained truss assembly designed to support a cantilevered platform, external to the helicopter's cabin, to which the weapon system's turret is attached. Existing deck connection points are utilized to secure the interface pallet assembly to the cabin deck. The interface pallet assembly adds 20E to the downward angle of fire of the weapon system and provides for azimuth rotation of 180E. The present assembly possesses the rotational stiffness required by the turret stabilization system in order to maintain firing accuracy during burst mode sequences. The interface pallet assembly is fabricated of a variety of strong, lightweight materials so as to not unduly add to the overall weight of the helicopter and its payload, and provides storage or mounting locations for accessories associated with the turret and weapon system.

16 Claims, 5 Drawing Sheets

INTERFACE PALLET ASSEMBLY FOR A HELICOPTER-BASED WEAPON SYSTEM

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to ordnance mounting assemblies and, more particularly, to a mounting assembly for attachment to a helicopter floor to provide a stable mount for a machine gun or other weapon system, and to increase the weapon system's field of fire by positioning all or most of the weapon system outside of the helicopter's cabin.

2. Description of the Background

The utility of a weapon system is largely proportional to the extent of its field of fire. The field of fire can be limited by certain physical attributes of the system itself, for example, the manner in which it is mounted or supported, and/or the type of vehicle used to transport the weapon system. One vehicle that introduces significant limitations is the helicopter. The field of fire for a helicopter-based weapon system is severely limited by the presence of the main rotor overhead and the secondary rotor positioned on the tail. Thus, the field of fire is primarily directed downward and/or forward. Moreover, if the weapon system is mounted within the helicopter's cabin it may experience additional limitations on its field of fire due to the dimensions of the opening through which it is fired.

The challenge of maximizing the effective field of fire of a helicopter-based weapon system therefore became an issue of positioning all or most of the device outside of the helicopter's cabin. The present inventor is not the first to devise means for mounting a weapon system external to a helicopter's cabin.

There are several examples in this regard.

For example, U.S. Pat. No. 5,421,239 to Sanderson discloses an aircraft armament mounting system that includes an elongated support plank member which is longitudinally insertable transversely through the aircraft cabin area so that a central portion of the plank is disposed within the cabin area with opposite end portions of the plank projecting outwardly from the aircraft. The central plank portion is suitably anchored within the cabin area, and the outwardly projecting plank end portions are configured to removably support machine guns supplied with belted ammunition from magazine boxes secured to the top side of the central plank portion within the cabin area.

U.S. Pat. No. 5,767,436 to Sanderson et al. discloses an elongated support plank structure that longitudinally extends transversely through the cabin area of a helicopter and has outer end portions projecting outwardly beyond opposite sides of the helicopter. A pair of 30 mm. machine guns are mounted on the plank end portions and are supplied with belted ammunition from magazine boxes mounted on the plank within the cabin area. The 30 mm. machine guns are secured to the outer plank end portions by specially designed mounting structures each having a cradle portion with axis-adjustable roller assemblies that engage the gun and essentially preclude lateral movement thereof relative to the cradle, but permit roller-guided longitudinal gun recoil movement, during firing of the gun. The field of fire provided by this mounting structure is fixed essentially forward in the direction of the helicopter's flight path, and the lightweight, M230 30 mm. machine guns do not possess the same capabilities (e.g. firepower) of larger, heavier MK44 systems.

U.S. Pat. No. 6,250,197 to Sanderson discloses a machine gun and associated armament apparatus including an ammunition box for supplying belted ammunition to the gun. The gun and associated apparatus are exteriorly supported on a landing gear sponson tow plate of a helicopter, adjacent a cabin area gunner's window, using a specially designed pintle support structure. The external mounting of the gun and associated armament apparatus frees up cabin space and permits the gunner's window to be closed with the gun in a ready position.

While each of the prior art devices detailed above provides an ability to mount all or most of a weapon system outside of a helicopter's cabin, thereby increasing the weapon's field of fire, they are meant to accommodate only relatively small, lightweight weapon systems (e.g. small caliber machine guns, weapons not requiring mounting turrets). The installation of larger, heavier weapon systems (e.g. chain guns with stabilized turret systems) in a helicopter raises the additional issue of preserving the in-flight stability of the aircraft. To the best of the knowledge of the present inventor, a mounting assembly (i.e. an interface pallet) for positioning all or most of a large, heavy weapon system external to a helicopter's cabin does not exist.

It would, therefore, be greatly advantageous to provide an interface pallet assembly that, in addition to positioning all or most of a weapon system outside of the helicopter's cabin, in order to increase its field of fire, is designed to accommodate a large, heavy weapon inclusive of a stabilized turret. An apparatus for this purpose must preserve the in-flight stability of the aircraft. It should also utilize existing points of connection to the helicopter's deck, be fabricated of materials with high strength-to-weight ratios, and provide a storage or mounting location for accessories associated with the weapon system.

SUMMARY OF THE INVENTION

It is, therefore, an object of the present invention to provide an interface pallet assembly for positioning all or most of a large, heavy weapon system external to a helicopter's cabin in order to increase its field of fire.

It is another object of the present invention to provide an improved interface pallet assembly that extends a helicopter-based weapon system's downwardly-angled field of fire without negatively impacting its azimuth rotation capability, thereby allowing the weapon system to be used for helicopter-based airborne mine clearance missions.

Yet another object of the present invention is to provide an improved interface pallet assembly that preserves the in-flight stability of the helicopter by equally distributing the forces associated with the weight and recoil of the weapon system to the deck of the aircraft.

It is still another object of the present invention to provide an improved interface pallet assembly that is fabricated of materials with high strength-to-weight ratios so as to not unduly add to the overall weight of the helicopter and its payload.

It is another object of the present invention is to provide an improved interface pallet assembly as described above that attaches to existing points of connection on the helicopter's deck.

Still another object of the present invention is to provide an improved interface pallet assembly that includes storage or mounting locations for accessories associated with the weapon system (e.g. ammunition canisters, batteries).

According to the present invention, the above-described and other objects are accomplished by an interface pallet assembly for use between the cabin deck of a helicopter (e.g. the MH60S helicopter) and a large, heavy weapon system (e.g. the stabilized turret system and deck-mounted MK44 30 mm. chain gun). The present invention generally incorporates a platform including a cantilevered pallet mounted inside the helicopter and extending downward at an angle to a turret plate external to one side of the helicopter's cabin, to which the weapon system's stabilized turret is attached. In addition, a truss assembly maintains appropriate ground clearance while supporting the platform. The one-sided design of the present invention allows the other side of the helicopter's cabin to be utilized for activities such as search and rescue missions (i.e. the deployment of a winch to lift/lower personnel, equipment, and/or supplies to/from the helicopter).

The existing deck connection points (e.g. five cargo tie-down locations in the MH60S helicopter) are utilized to secure the interface pallet assembly to the cabin deck. The five-point connection pattern between the interface pallet assembly and the MH60S helicopter deck maintains the overall balance of the airframe by providing for the even distribution of the weight and recoil forces associated with the MK 44 weapon system (i.e. a maximum load of 15,000 pounds at any single tie-down location). The interface pallet assembly adds 20E to the downward angle of fire of the weapon system and also provides for azimuth rotation of 180E. The present invention possesses a significant degree of rotational stiffness (i.e. 250,000–480,000 Newton-meters/radian, depending upon the materials of construction). Sufficient rotational stiffness is required by the aforementioned turret stabilization system to maintain the firing accuracy of the MK 44's full impulse round during burst mode firing sequences. The interface pallet assembly is fabricated of a variety of materials with high strength-to-weight ratios so as to not unduly add to the overall weight of the helicopter and its payload, and provides storage or mounting locations for a 200-round ammunition container and the battery system that powers the turret and weapon system.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
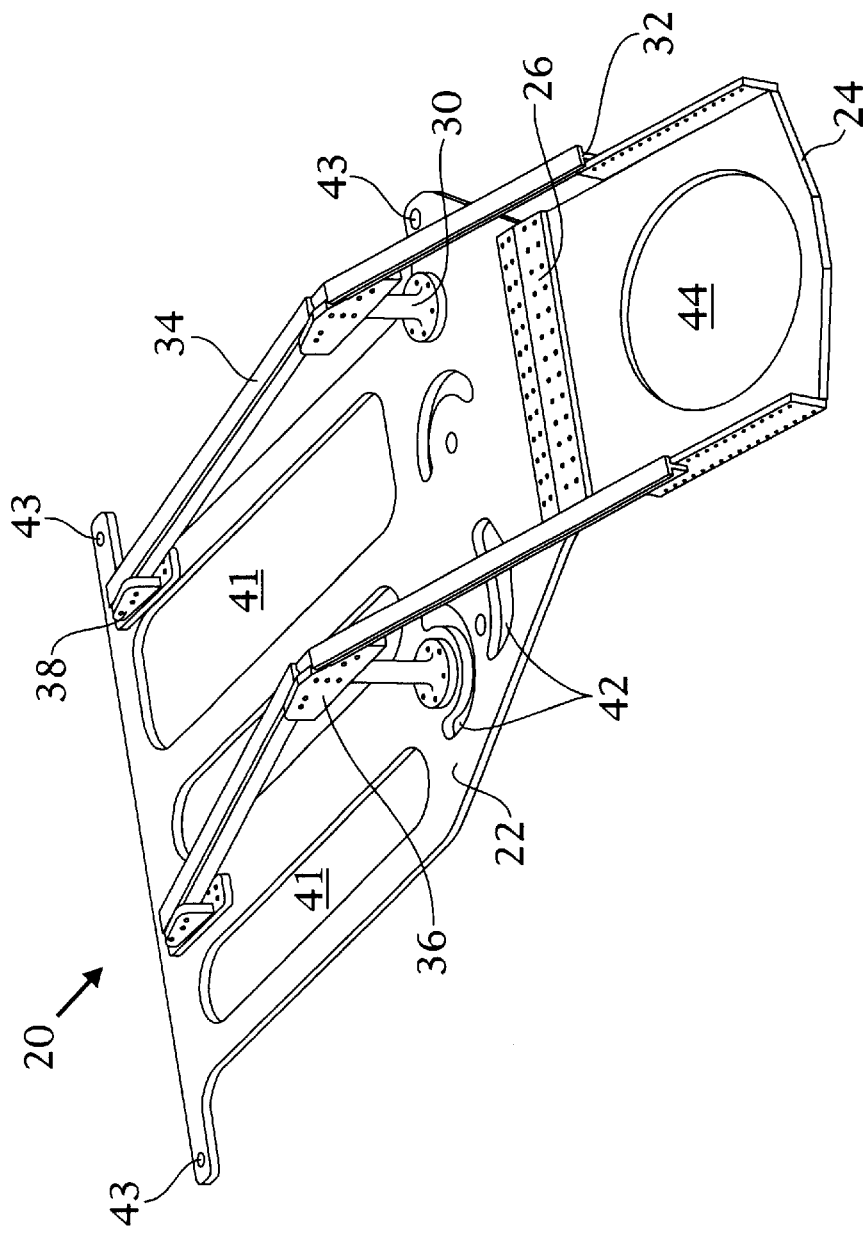
FIG. 1 is an isometric view of an interface pallet assembly 20 according to the present invention.
Figure 2:
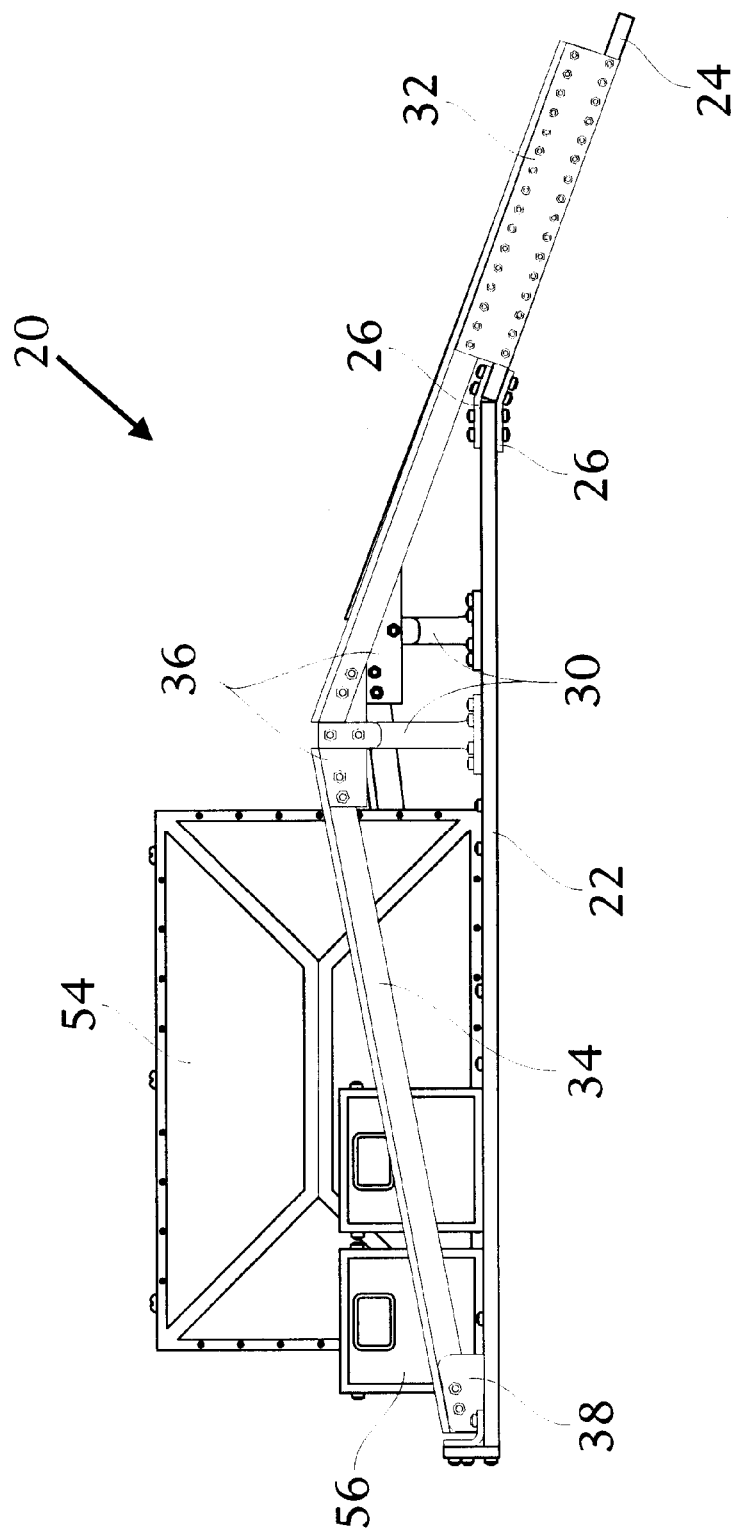
FIG. 2 is a side perspective view of the interface pallet assembly 20 of FIG. 1.
Figure 3:
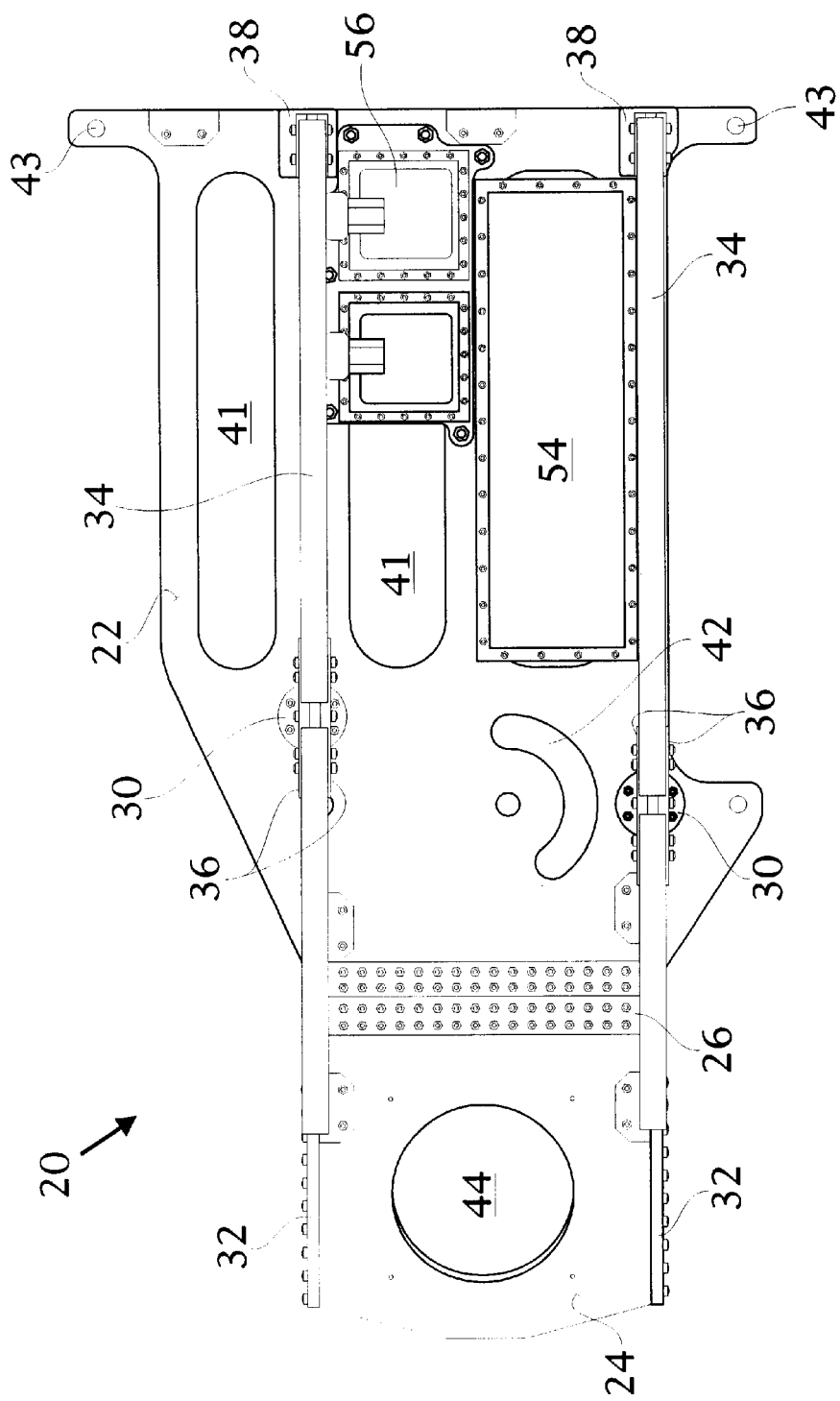
FIG. 3 is a top perspective view of the interface pallet assembly 20 of FIGS. 1 and 2.

FIG. 1 is an isometric view of an interface pallet assembly 20 according to the present invention. FIGS. 2 and 3 are, respectively side and top perspective views of the interface pallet assembly 20. The interface pallet assembly 20 generally comprises a pallet 22 joined to a turret plate 24 at a downward angle, and a pair of supporting truss assemblies connected between the pallet 22 and turret plate 24. Each of the truss assemblies has an angle greater than that of the pallet 22 and turret plate 24 to increase the structural rigidity thereof.

Each truss assembly comprises a front tee section 32 attached at one end to the pallet 22, and a rear tee section 34 attached at one end to the turret plate 24 and at the other end to the front tee section 32. In addition, a post 30 is attached between the junction of the front and rear tee sections 32, 34 to the pallet 22. Two band aid plates 26 are also provided for increased strength, two devises 38 are provided for connecting the rear tee sections 34 to the pallet 22, and two splice supports 36 connect the front and rear tee sections 34, 43 together. The foregoing components create a movable platform that positions the weapon system substantially out of the helicopter cabin, adds 20E to the downward angle of fire, and also provides for azimuth rotation of 180E. Moreover, the interface pallet assembly 20 attaches at the existing deck connection points (e.g. five cargo tie-down locations in the MH60S helicopter) to secure the interface pallet assembly to the cabin deck.

The pallet 22, turret plate 24, and band aid plates 26 are preferably fabricated of sections of rigid, commercially available materials (e.g. type 7075 aluminum, various polymer or metal matrix composites).

The pallet 22 includes one or more cut-outs 41, 42 that assist in directing the load path and in reducing the overall weight of the pallet 22 without compromising its structural integrity. The cut-outs 41 may also provide mounting locations for certain accessories (discussed below) associated with the weapon system 50 shown in FIG. 4.

The pallet 22 also includes a plurality of clearance holes 43 utilized to attach the interface pallet assembly 20 to the connection points (e.g. tie-downs) located on the helicopter's cabin deck. There are two of these clearance holes 43 at the back of the pallet 22, and three evenly-spaced holes 43 across the front. This five-point connection pattern between the interface pallet assembly and the MH60S helicopter deck maintains the overall balance of the airframe by providing for the even distribution of the weight and recoil forces associated with the MK 44 weapon system (i.e. a maximum load of 15,000 pounds at any single tie-down location).

The turret plate 24 includes a cut-out 44 that generally conforms to the base of the turret 52 (see FIG. 4) of the weapon system 50. In addition to reducing the overall weight of the plate 24, without compromising its structural integrity, the cut-out 44 also provides access to the weapon system 50 from below. The band aid plates 26 are bent longitudinally, at its transverse midpoint, to an angle of 20E.

The support posts 30 are preferably fabricated of lengths of rigid, commercially available, aluminum round stock (e.g. 6" diameter type 2024 or 7075). The front and rear tees 32, 34, respectively, are preferably machined from lengths of rigid, commercially available materials (e.g. type 4140 steel plate for front tees 32, type 7075 aluminum plate for rear tees 34). Finally, the splice supports 36 and devises 38 are machined components preferably fabricated of lengths of rigid, commercially available, type 7075 aluminum that vary in size.

As seen in FIG. 2, the pallet 22 also includes areas where certain accessories associated with the weapon system 50, such as an ammunition canister 54 or batteries 56 utilized during its operation, may be mounted.

The above-described components of the interface pallet assembly 20 according to the present invention are assembled as follows. Each of the fixed attachments disclosed herein may be, for example, a bolted or riveted connection.

A transverse edge of the pallet 22 is fixedly attached, along its top and bottom surfaces, to longitudinal edges of the band aid plates 26. The opposite longitudinal edges of the band aid plates 26 are fixedly attached to the top and bottom surfaces of the turret plate 24 along a transverse edge. Each of the longitudinal edges of the turret plate 24 are fixedly attached to a longitudinal edge of one of the front tees 32. The base end of each support post 30 is fixedly attached to the pallet 22 at specified locations. Each splice support 36 is fixedly attached to the distal end of a support post 30. Each clevis 38 is fixedly attached to the pallet 22 at specified locations along its transverse edge opposite that connected to the band aid plates 26. Each of the front tees 32 are fixedly attached at one end to an edge of the support plate 24, and at the other end to a pair of splice supports 36. Each of the rear tees 34 are fixedly attached at one end to a pair of splice supports 36, and at the other end to a clevis 38.

Figure 4:
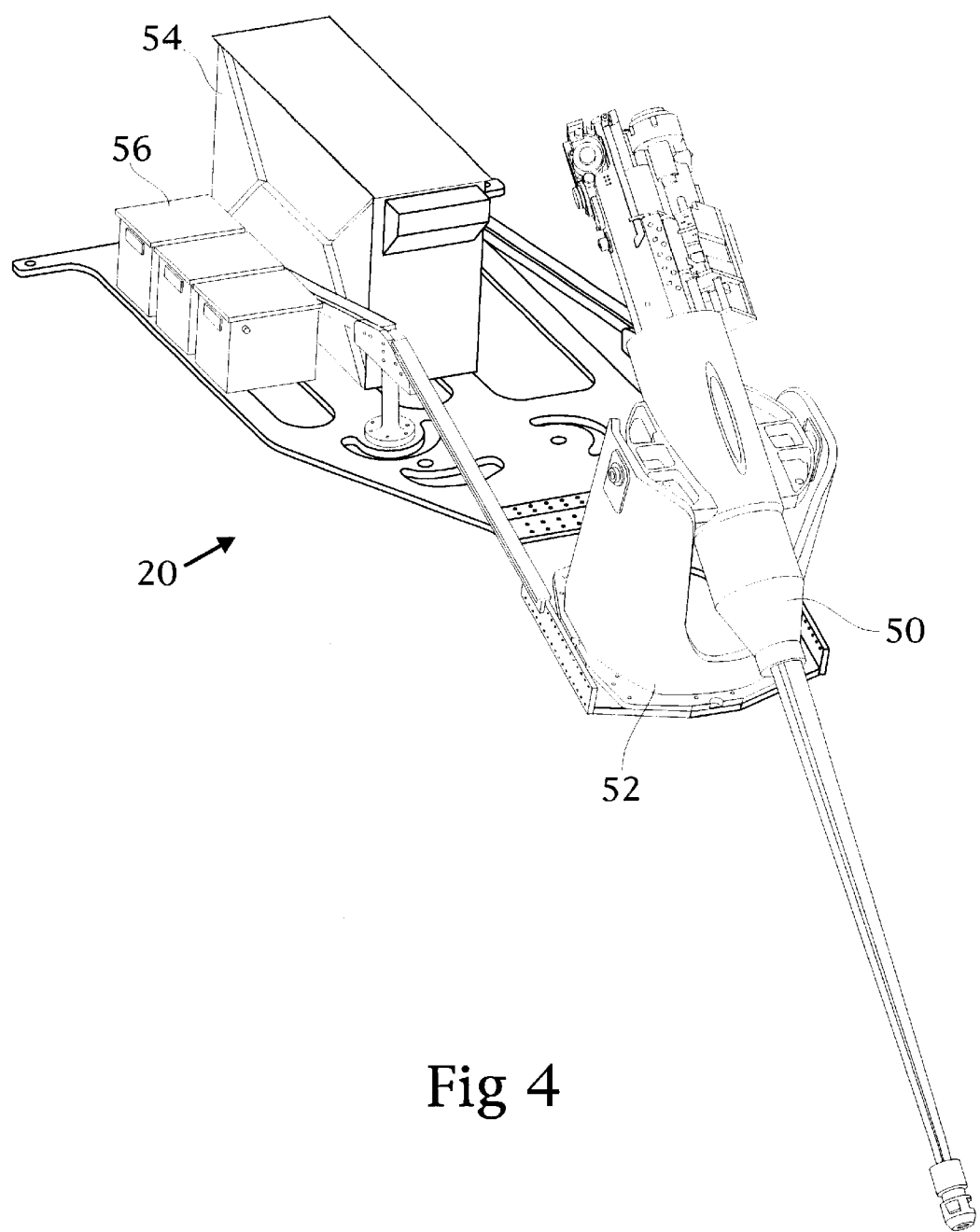
FIG. 4 is an isometric view of the interface pallet assembly 20 of FIGS. 1–3 showing the manner in which the weapon system 50 is attached to it.
Figure 5:
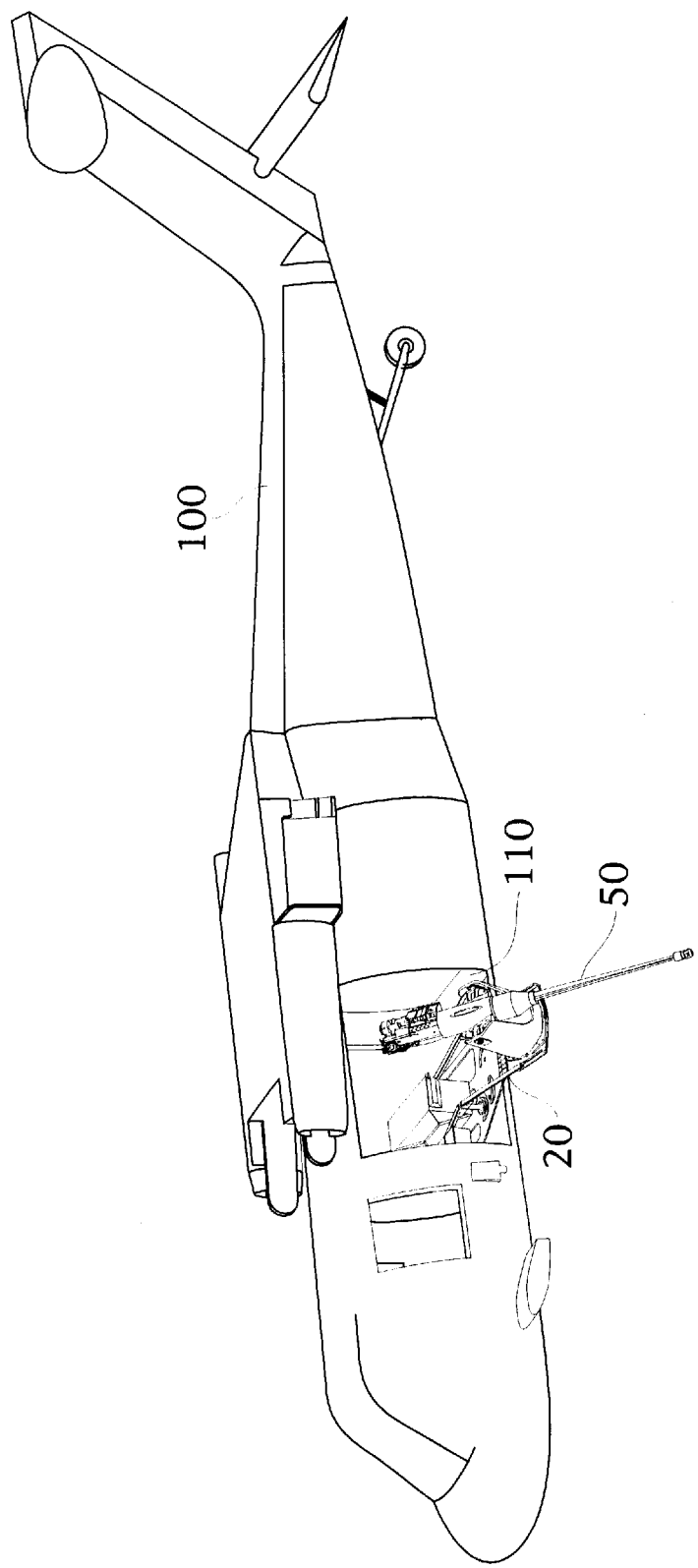
FIG. 5 is a side perspective view of a helicopter 100 showing the interface pallet assembly 20 of FIGS. 1–3 mounted to the cabin deck 110.

FIG. 4 shows the manner in which a weapon system 50 attaches to the interface pallet assembly 20 of FIGS. 1–3. FIG. 5 is a side perspective view of a helicopter 100 with the interface pallet assembly 20 of FIGS. 1–3 mounted on the cabin deck 110. The interface pallet assembly 20 may be fabricated of a variety of materials with high strength-to-weight ratios so as to not unduly add to the overall weight of the helicopter 100 and its payload.

With combined reference to FIGS. 1–5, once the interface pallet assembly 20 is completely assembled, it may be mounted on the cabin deck 110 of a helicopter 100 such that the turret plate 24 extends out of the cabin through an opening in the side of the aircraft 100. The plurality of clearance holes 43 present in the pallet 22 are utilized to fixedly attach the interface pallet assembly 20 to a corresponding plurality of pre-existing connection points (not shown in the Figures) located on the deck 110.

The weapon system 50 that the interface pallet assembly 20 is designed to accommodate may then be installed. The turret 52 is fixedly attached to the turret plate 24, positioning most, if not all, of the weapon system 50 outside of the cabin of the helicopter 100. Any desired accessories associated with the weapon system 50 such as an ammunition canister 54 or batteries 56 are then mounted on designated areas of the pallet 22. The aforesaid configuration of the interface pallet assembly 20 serves to evenly distribute the load, or forces, generated by the weight of the weapon system 50 and its recoil during operation across the plurality of preexisting connection points located on the deck 110 of the helicopter 100. An even distribution, across the deck, of the load, or forces, associated with the presence and operation of an on-board weapon system 50 is critical to preserving the in-flight stability of the helicopter 100 The positioning of the weapon system 50 external to the cabin of the helicopter 100 on a cantilevered plate 24 (angled downward 20E) serves to widen the field of fire below the aircraft 100 while maintaining an azimuth rotation capability of 180E. This allows the weapon system 50 to fire at a greater range of surface-based targets while the helicopter 100 maintains a level flight path. For example, the additional downward firing capability created by the present invention has been demonstrated to be very beneficial for mine clearing purposes.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An interface pallet assembly for a helicopter-based weapon system, comprising:

a pallet attachable to existing deck connection points of a helicopter to secure the interface pallet assembly thereto;

a turret plate for mounting a weapon thereon, said turret plate being integrally attached to said pallet and adapted to extend out of a side of the helicopter at a downward angle relative to said deck;

a pair of supports each comprising an angled strut attached between said pallet and turret plate, the angle of said strut being greater than the angle of said pallet and turret plate to increase the structural rigidity thereof.

2. The interface pallet assembly according to claim 1, wherein said supports each further comprise a front tee section attached at one end to said pallet, a rear tee section attached at one end to said turret plate and at another end to said front tee section, and a post attached between the junction of said front and rear tee sections to said pallet.

3. The interface pallet assembly for a helicopter-based weapon system according to claim 2, wherein said pair of supports distributes loads and forces generated by said weapon system evenly across said existing deck connection points of the helicopter, thereby maintaining in-flight stability of said helicopter.

4. The interface pallet assembly for a helicopter-based weapon system according to claim 1, wherein said turret plate extends out of the side of the helicopter at a downward angle of 20 degrees relative to said deck.

5. The interface pallet assembly for a helicopter-based weapon system according to claim 1, wherein a weapon mounted on said turret plate is positioned outside of said helicopter's cabin.

6. The interface pallet assembly for a helicopter-based weapon system according to claim 5, wherein the downward angle of and outside extension of the turret plate from the side of the helicopter increases the mounted weapon's downward firing angle, thereby increasing the weapon's effective field of fire when said helicopter maintains a level flight path.

7. The interface pallet assembly for a helicopter-based weapon system according to claim 1, wherein said pallet further comprises a plurality of mounting locations for accessories associated with said weapon system.

8. The interface pallet assembly for a helicopter-based weapon system according to claim 1, wherein said pallet further comprises a plurality of apertures to reduce the overall weight of the interface pallet assembly.

9. An interface pallet assembly for a helicopter-based weapon system, comprising:

a first plate having an array of connection points to a cabin deck of a helicopter;

a second plate comprising an opening corresponding to a base of a weapon system;

a third plate fixedly attached to said first and said second plates, said third plate comprising a longitudinal bend; and a truss assembly fixedly attached to said first and said second plates, said truss assembly comprising a configuration matching said longitudinal bend in said third plate;

wherein said first, second, and third plates in combination with said truss assembly form a cantilevered assembly facilitating a mechanical connection between said helicopter cabin deck and said weapon system.

10. The interface pallet assembly for a helicopter-based weapon system according to claim 9, wherein said longitudinal bend is an angle of 20E.

11. The interface pallet assembly for a helicopter-based weapon system according to claim 10, wherein said truss assembly distributes loads and forces generated by said weapon system evenly across said array of connection points on said cabin deck, thereby maintaining in-flight stability of said helicopter.

12. The interface pallet assembly for a helicopter-based weapon system according to claim 9, wherein said cantilevered mechanical connection between said cabin deck and said weapon system substantially positions said weapon system outside of said helicopter's cabin.

13. The interface pallet assembly for a helicopter-based weapon system according to claim 12, wherein said substantially outside position of said weapon system increases said weapon system's downward firing angle, thereby increasing said weapon system's effective field of fire when said helicopter maintains a level flight path.

14. The interface pallet assembly for a helicopter-based weapon system according to claim 9, wherein said first plate further comprises a plurality of storage and/or mounting locations for accessories associated with said weapon system.

15. The interface pallet assembly for a helicopter-based weapon system according to claim 9, wherein said first plate further comprises a plurality of openings to reduce said first plate's overall weight.

16. The interface pallet assembly for a helicopter-based weapon system according to claim 9, wherein said first, second, and third plates and said truss assembly are fabricated of materials possessing high strength-to-weight ratios, thereby minimizing any increase in said helicopter's payload.

* * * * *